(12) United States Patent
Konarski et al.

(10) Patent No.: US 7,915,319 B2
(45) Date of Patent: Mar. 29, 2011

(54) VISIBLE LIGHT CURING SYSTEMS, METHODS FOR REDUCING HEALTH RISKS TO INDIVIDUALS EXPOSED TO SYSTEMS DESIGNED TO CURE CURABLE COMPOSITIONS BY EXPOSURE TO RADIATION, METHODS FOR BONDING SUBSTRATES AND VISIBLE LIGHT CURING COMPOSITIONS

(75) Inventors: Mark M. Konarski, Old Saybrook, CT (US); Edwin R. Perez, Newington, CT (US); Eerik Maandi, Rocky Hill, CT (US); Vic Kadziela, Rocky Hill, CT (US); Steven J. Hemsen, Southington, CT (US); Ronald E. Belek, Coventry, CT (US)

(73) Assignee: Henkel Corporation, Rocky Hill, CT (US)

( * ) Notice: Subject to any disclaimer, the term of this patent is extended or adjusted under 35 U.S.C. 154(b) by 1499 days.

(21) Appl. No.: 11/305,005

(22) Filed: Dec. 19, 2005

(65) Prior Publication Data

US 2007/0138411 A1 Jun. 21, 2007

(51) Int. Cl.
*C08F 2/50* (2006.01)
*C08J 3/28* (2006.01)
*C08F 2/42* (2006.01)

(52) U.S. Cl. ............... 522/96; 522/90; 522/95; 522/97; 522/113; 522/114; 522/120; 522/121; 522/150; 522/151; 522/152; 522/173; 522/174; 522/181; 156/60; 156/182; 156/99; 156/272.2; 156/275.1; 156/275.3; 156/275.5; 156/275.7; 428/355 R; 428/355 CN; 428/355 N; 427/508; 427/510; 427/516; 427/207.1; 427/208

(58) Field of Classification Search ............ 522/90, 522/95, 96, 97, 113, 114, 120, 121, 150, 522/152, 151, 173, 174; 156/60, 182, 99, 156/272.2, 275.1, 275.3, 275.5, 275.7; 428/355, 428/355 CN, 355 N; 427/508, 510, 516, 207.1, 208

See application file for complete search history.

(56) References Cited

U.S. PATENT DOCUMENTS

| | | | |
|---|---|---|---|
| 4,258,123 A | 3/1981 | Nagashima et al. | 430/281.1 |
| 4,505,793 A | 3/1985 | Tamoto et al. | 522/26 |
| 4,604,295 A * | 8/1986 | Humphreys | 427/519 |
| 4,846,165 A * | 7/1989 | Hare et al. | 228/156 |
| 4,938,831 A * | 7/1990 | Wolf, Jr. | 156/275.3 |
| 5,395,862 A | 3/1995 | Neckers et al. | 522/25 |
| 5,399,770 A | 3/1995 | Leppard et al. | 568/15 |
| 5,451,343 A | 9/1995 | Neckers et al. | 252/582 |
| 5,545,676 A | 8/1996 | Palazzotto et al. | 522/15 |
| 5,578,693 A | 11/1996 | Hagstrom et al. | 528/75 |
| 5,624,757 A * | 4/1997 | Smith | 428/412 |
| 6,025,026 A | 2/2000 | Smith et al. | 427/316 |
| 6,520,663 B1 | 2/2003 | Holmes et al. | 362/285 |
| 6,734,221 B1 | 5/2004 | Misiak | 522/16 |
| 6,881,964 B2 | 4/2005 | Holmes | 250/492.1 |
| 6,906,112 B1 | 6/2005 | Wojciak et al. | 522/18 |
| 6,921,454 B2 | 7/2005 | Shi et al. | 156/275.5 |
| 2003/0129397 A1* | 7/2003 | Wilson et al. | 428/375 |

FOREIGN PATENT DOCUMENTS

| | | |
|---|---|---|
| EP | 0 369 645 A1 | 5/1990 |
| EP | 0 563 925 A1 | 10/1993 |
| GB | 2216136 A * | 10/1989 |
| WO | WO 2004/011848 A2 | 2/2004 |
| WO | WO 2006/001958 | 1/2006 |

OTHER PUBLICATIONS

Photomer products for UV/EB Curing. Cognis Corporation (2003). [online]. [retrieved online Mar. 16, 2009]. Retrived from URL:<.*
Cytec Product Guide. Radcure Energy Curable Resins. (2006). [online]. [retrived online Mar. 16, 2009]. Retrieved from URL:<.*
Shear Strength of Adhesive Bonds Between Rigid Substrates by the Block-Shear Method. American Society For Testing Materials, ASTM D D4501, pp. 1-5 (May 2001).

\* cited by examiner

*Primary Examiner* — Sanza L McClendon
(74) *Attorney, Agent, or Firm* — Steven C. Bauman (57) ABSTRACT

The present invention provides visible light curing systems, methods for reducing health risks to individuals exposed to radiation curing systems, methods for bonding substrates and visible light curing compositions.

14 Claims, 1 Drawing Sheet

FIG. 1

VISIBLE LIGHT CURING SYSTEMS, METHODS FOR REDUCING HEALTH RISKS TO INDIVIDUALS EXPOSED TO SYSTEMS DESIGNED TO CURE CURABLE COMPOSITIONS BY EXPOSURE TO RADIATION, METHODS FOR BONDING SUBSTRATES AND VISIBLE LIGHT CURING COMPOSITIONS

BACKGROUND OF THE INVENTION

1. Field of the Invention

The present invention provides visible light curing systems, methods for reducing health risks to individuals exposed to systems designed to cure curable compositions by exposure to radiation, methods for bonding substrates and visible light curing compositions.

2. Brief Description of Related Technology

According to the U.S. Department of Labor's Occupational Safety and Health Administration ("OSHA"), non-ionizing radiation is a series of energy waves posed the oscillating electric and magnetic fields traveling at the speed of light. Non-ionizing radiation include suspected of ultraviolet, visible, infrared, microwave, radio frequency, and extremely low frequency area raises commonly operating the UV, visible and IR frequencies. UV radiation has a high photon energy range, and as such is particularly hazardous because there are usually no immediate symptoms of excessive exposure.

According to the U.S. Department of Health and Human Resources Center for Disease Control and Prevention's National Institute of Occupational Safety and Health ("NIOSH") over exposure to UV radiation may result in the burning of exposed skin and have serious eye effects. Eye exposure is especially dangerous because the results of over exposure are not immediately evident. Long-term unprotected exposure can lead to partial loss of vision, accelerated skin aging an increased risk of skin cancer.

Unfortunately, no OSHA standard exists for UV radiation exposure. Nevertheless NIOSH has made recommendations for UV light in the spectral region of 200 to 400 nm, with limitations on exposure, particularly direct exposure to the eyes and skin, without protection, such as shaded glass barriers.

Apart from laser-generated radiation (in either the UV, IR or visible spectrum), no OSHA or NIOSH recommendations exist for exposure to visible radiation. And no OSHA standard exists for exposure to lasers, though their performance is regulated by the U.S. Department of Health and Human Resources Food and Drug Administration's Bureau of Radiological Health, under 21 CFR 1040.

Thus, the use of the UV radiation requires many precautions in order to limit worker and others exposure. Unlike radiation sources that generates UV radiation, apart from lasers, radiation sources that generates visible radiation are not accompanied by the same set of safety and health concerns.

It would be advantageous therefore to design, develop and offer a visible light curing system to allow workers and others to perform and observe the assembly of products using light curable compositions, without the attendant risk of their safety and/or health.

One potential source of visible light for use to cure photocurable compositions are light emitting diode ("LED") devices, with a subset of such devices being organic light emitting diode devices.

A LED is a semiconductor device that emits incoherent narrow-spectrum light when electrically biased in the forward direction. This effect is a form of electroluminescence. The color of the emitted light depends on the chemical composition of the semiconducting material used, and can be near-ultraviolet, visible or infrared.

If the emissive layer material of an LED is an organic compound, it is known as an organic light emitting diode ("OLED"). To function as a semiconductor, the organic emissive material must have conjugated pi bonds. The emissive material can be a small organic molecule in a crystalline phase, or a polymer. Polymer materials can be flexible; such LEDs are known as PLEDs or FLEDs. Compared with regular LEDs, OLEDs are lighter and polymer LEDs can have the added benefit of being flexible.

SUMMARY OF THE INVENTION

In one aspect, the present invention provides a method for reducing the health risks of an individual exposed to an environment in which radiation curable compositions are being cured. The method includes:

Providing a radiation curable composition, capable of being cured by exposure to radiation solely in the visible range of the electromagnetic spectrum, Providing two or more substrates, at least one of which is substantially transmissive to radiation in the visible range of the electromagnetic spectrum, to at least one of which the radiation curable composition is to be applied, Applying the radiation curable composition to the at least one substrate, and Exposing the radiation curable composition applied to at least one substrate to a source which emits solely radiation in the visible range of the electromagnetic spectrum for a period of time of 60 seconds or less so as to cure the radiation curable composition, where the health risks are selected from erythema, photokeratitis, and combinations thereof.

In another aspect, the invention provides a method of bonding two or more substrates, at least one of which is substantially transmissive to radiation in the visible range of the electromagnetic spectrum. This method includes:

Providing a radiation curable composition, capable of being cured by exposure to radiation solely in the visible range of the electromagnetic spectrum, Providing two or more substrates, at least one of which is substantially transmissive to radiation in the visible range of the electromagnetic spectrum, to at least one of which the radiation curable composition is to be applied, Applying the radiation curable composition to the at least one substrate, and Exposing the radiation curable composition applied to at least one substrate to a source that emits solely radiation in the visible range of the electromagnetic spectrum for a period of time of 60 seconds or less so as to cure the radiation curable composition.

In this method, the cured radiation curable composition demonstrates a shear bond strength of greater than 1,000 psi on at least one substrate constructed from polycarbonate. In addition, the cured radiation curable composition demonstrates substantially no coloring.

In yet another aspect, the invention provides a system for bonding together two or more substrates, at least one of which being constructed from a material that is substantially transmissive to radiation in the visible range of the electromagnetic spectrum, using a radiation curable composition which is capable of curing upon exposure to radiation in the visible range of the electromagnetic spectrum. The system includes:

A source for emitting radiation solely in the visible range of the electromagnetic spectrum, A source for dispensing radiation curable composition, A station where radiation curable composition is dispensed onto at least one substrate, and A station where the at least one substrate to which has been applied radiation curable composition is exposed solely to radiation in the visible range of the electromagnetic spectrum generated from the radiation-generating source.

In still another aspect, the invention provides a visible light curable composition. The composition includes:

A urethane acrylate component, comprising one or more of

An aliphatic urethane triacrylate comprising the combination of greater than 50% of a urethane acrylate and less than 50% of tripropylene glycol diacrylate, An aliphatic polyether urethane oligomer comprising a multifunctional terminally unsaturated urethane oligomer comprising the reaction product of (a) a terminally unsaturated isocyanate containing polyurethane oligomer with (b) an alkoxylated polyhydric alcohol, or A trifunctional aliphatic urethane acrylate oligomer, A reactive diluent comprising the combination of two or more of hexane diol di(meth)acrylate, N,N'-dimethyl acrylamide, ethoxyethoxyethyl acrylate and tetrahydrafurfuryl acrylate, and A photoinitiator-triggered upon exposure to radiation in the visible range of the electromagnetic spectrum.

The cured radiation curable composition demonstrates a shear bond strength of greater than 1,000 psi, such as greater than 2,000 psi, desirably greater than 3,000 psi when bonding together two substrates where at least one is constructed from polycarbonate.

DETAILED DESCRIPTION OF THE INVENTION

As noted above, the invention provides in various aspects a method for reducing certain health risks in environment in which radiation curable compositions are being cured; a method for boning substrates, a visible light radiation curing system, and visible light curable compositions.

For instance, in a first aspect, the invention provides a method for reducing the health risks of an individual exposed to an environment in which radiation curable compositions are being cured. This method as noted above includes:

Providing a radiation curable composition, capable of being cured by exposure to radiation solely in the visible range of the electromagnetic spectrum, Providing two or more substrates, at least one of which is substantially transmissive to radiation in the visible range of the electromagnetic spectrum, to at least one of which the radiation curable composition is to be applied, Applying the radiation curable composition to the at least one substrate, and Exposing the radiation curable composition applied to at least one substrate to a source which emits solely radiation in the visible range of the electromagnetic spectrum for a period of time of 60 seconds or less so as to cure the radiation curable composition, where the health risks are selected from erythema, photokeratitis, and combinations thereof.

In a second aspect, the invention provides a method of bonding two or more substrates, at least one of which is substantially transmissive to radiation in the visible range of the electromagnetic spectrum. This method includes:

Providing a radiation curable composition, capable of being cured by exposure to radiation solely in the visible range of the electromagnetic spectrum, Providing two or more substrates, at least one of which is substantially transmissive to radiation in the visible range of the electromagnetic spectrum, to at least one of which the radiation curable composition is to be applied, Applying the radiation curable composition to the at least one substrate, and Exposing the radiation curable composition applied to at least one substrate to a source that emits solely radiation in the visible range of the electromagnetic spectrum for a period of time of 60 seconds or less so as to cure the radiation curable composition.

Desirably, the cured radiation curable composition formed by this method demonstrates a shear bond strength of greater than 1,000 psi, such as greater than 2,000 psi, for instance greater than 3,500 psi, in bonding together two substrates, where at least one is constructed from polycarbonate.

Desirably, the cured radiation curable composition formed by this method demonstrates substantially no coloring, as coloring is viewed by the user as disadvantage, particularly where the color is a yellowing that is readily apparent on visual inspection when colorless substrates are bonded together. That is not to say, however, that a composition with a certain color or degree of color may not be desirable for say detection purposes, or to determine when the composition has cured (if the color changes from one color to another upon cure, develops a color from no color upon cure, or loses a color upon cure).

In a third aspect, the invention provides a system for bonding together two or more substrates, at least one of which being constructed from a material that is substantially transmissive to radiation in the visible range of the electromagnetic spectrum, using a radiation curable composition which is capable of curing upon exposure to radiation in the visible range of the electromagnetic spectrum. The system includes:

A source for generating radiation solely in the visible range of the electromagnetic spectrum, A source for dispensing radiation curable composition, A station wherein radiation curable composition is dispensed onto at least one substrate, and A station wherein the at least substrate to which has been applied radiation curable composition is exposed solely to radiation in the visible range of the electromagnetic spectrum generated from the radiation-generating source.

Figure 1:
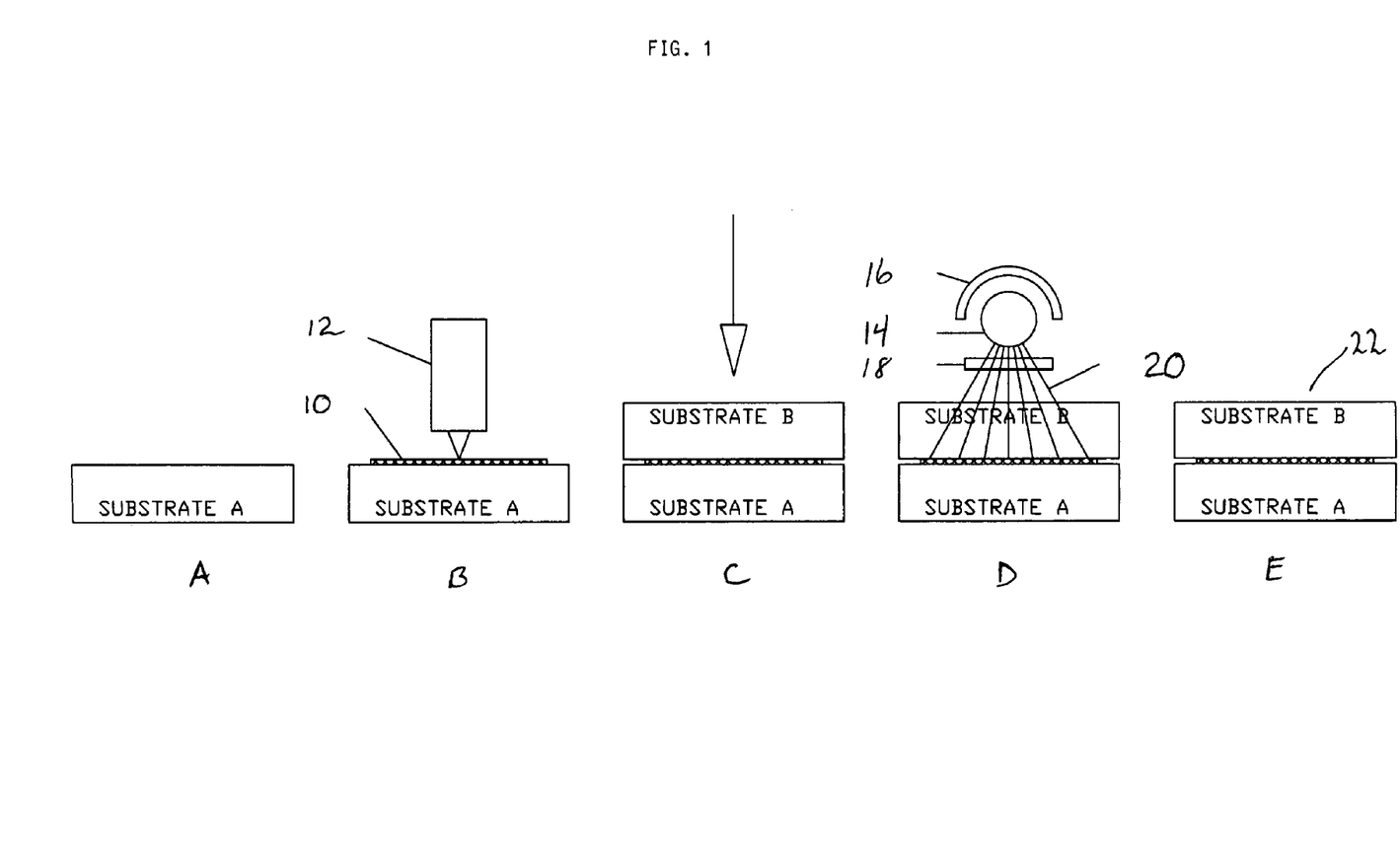
FIG. 1 depicts a schematic representation of a schematic diagram of a system for bonding together two or more substrates, at least one of which being constructed from a material that is substantially transmissive to radiation in the visible range of the electromagnetic spectrum.

With reference to FIG. 1, it is seen that the system may be viewed with respect to five stages. In the first stage, labeled A in FIG. 1, substrate A is positioned for assembly. In the second stage, labeled B in FIG. 1, an inventive composition 10 is dispensed onto a receiving surface of substrate A from dispenser 12. In the third stage, labeled C in FIG. 1, substrate B is brought into contact with substrate A such that composition 10 is between the two substrates. Next, in the fourth stage, labeled D in FIG. 1, radiation is emitted from a radiation generating source 14 coupled with a reflector 16 and filtered through UV filter 18. The filtered radiation 20 that is transmitted toward substrate B contains radiation solely within the visible range of electromagnetic spectrum. Finally, in the fifth stage, labeled E in FIG. 1, after exposure to such radiation 20 an assembly 22 is formed.

In FIG. 1, substrate B must be able to be substantially transmissive to radiation in the visible range of the electromagnetic spectrum. Substrate A, on the other hand, may or may not share that property.

The radiation generating source may be a metal halide or a mercury based lamp (such as mercury arc, metal halide, halogen and flourescent lamps), equipped to eliminate radiation below 400 nm (such as with a wavelength targeting optical filter positioned between the lamp and target composition, which may act as a UV absorbing or UV reflecting filter, or a visible light only reflector), a LED that emits radiation above 400 nm or an OLED that emits radiation above 400 nm.

When equipped with an appropriate filter to prevent the emission of radiation other than that in the visible range of the electromagnetic spectrum, the mercury-based lamp source of visible light for instance will emit solely visible light, which thus will be the only radiation available to cure the curable composition. Additional sources of radiation that may be equipped with such a filter include arc lamps, such as those disclosed in U.S. Pat. Nos. 6,520,663 to Holmes et al. and 6,881,964 to Holmes, the contents of which are incorporated herein by reference in their entirety. Other commonly available mercury-based lamps include halogen lamps, metal halide lamps, mercury vapor lamps, and electrode-less microwave lamps. An example of a commercially available lamp assembly that may be equipped with an appropriate filter is the LOCTITE brand ZETA 7420 (available from Henkel Corporation, Rocky Hill, Conn.). The LOCTITE brand ZETA 7420 includes a glass filter to reduce short and medium wavelength lamp emissions. The assembly can emit light in the visible blue and green region.

The LED-based light generation devices include at least one LED coupled to a power supply, which device delivers a high light output to the composition to be cured. The LED is a crystalline structure component, which when excited by an appropriate electrical current, produces light. Variations in the specific composition of the diode produce light within different spectral ranges. Devices of this nature are described more fully in International Patent Publication No. WO 2004/011848 A2 and International Patent Application No. PCT/US2005/016900, each of which being expressly incorporated by reference herein in its entirety. A commercially available one for this purpose is the LOCTITE brand 7700 LED (available from Henkel Corporation, Rocky Hill, Conn.).

In addition, OLED-based devices may also be employed to generate the visible light energy necessary to cure the curable compositions. An OLED is a polymer-based component, which when excited by an appropriate electrical current, produces light. Variations in the specific composition of the polymer produce light within different spectral ranges.

In a fourth aspect, the invention provides a visible light curable composition. The composition includes:

A urethane acrylate component, comprising one or more of

An aliphatic urethane triacrylate comprising the combination of greater than 50% of a urethane acrylate and less than 50% of tripropylene glycol diacrylate, an example of which is commercially available from Cognis Corporation under the tradename PHOTOMER 6019 (whose urethane acrylate is believed to have been prepared from isophorone diisocyanate and propylene glycol), An aliphatic polyether urethane oligomer comprising a multifunctional terminally unsaturated urethane oligomer comprising the reaction product of (a) a terminally unsaturated isocyanate containing polyurethane oligomer with (b) an alkoxylated polyhydric alcohol, such as those disclosed and claimed in U.S. Pat. No. 5,578,693, an example of which is commercially available from Bomar Specialties, Co. under the tradename BOMAR 582E (believed to have an ethyl and/or butyl ether backbone, having been made from hydrogenated methylene dianiline diisocyanate in ethoxyethoxyethyl acrylate), and A trifunctional aliphatic urethane acrylate oligomer, such as a tri-functional urethane acrylate oligomer having a polyether backbone, more desirably an aliphatic polyether urethane triacrylate, an example of which is commercially available from Bomar Specialties, Co. under the tradename BR 990 (believed to have been prepared from hexamethylene diisocyanate and caprolactone acrylate, which is hydroxy functionalized), A reactive diluent comprising the combination of two or more of hexane diol di(meth)acrylate, dimethyl acrylamide, ethoxyethoxyethyl acrylate and tetrahydrafurfuryl acrylate, and A photoinitiator triggered upon exposure to radiation in the visible range of the electromagnetic spectrum.

As noted, the cured radiation curable composition demonstrates a shear bond strength of greater than 1,000 psi, such as greater than 2,000 psi, desirably greater than 3,000 psi when bonding together two substrates where at least one is constructed from polycarbonate.

The urethane acrylate component of the visible light curable composition is made from at least one, desirably two, of aliphatic urethane triacrylate, aliphatic polyether urethane oligomer or trifunctional aliphatic urethane acrylate oligomer, which is prepared from a hydroxy-containing compound and an isocyanate-containing compound. The hydroxy-containing compound should be a polyol, such as one selected from 2,2-(4,4'-dihydroxydiphenyl)-propane, 4,4'-iso-propylidenedicyclohexanol, ethoxylated bisphenol-A, propoxylated bisphenol-A, 2,2-(4,4'-dihydroxydiphenyl)-butane, 3,3-(4,4'-dihydroxydiphenyl)-pentane, $\alpha,\alpha'$-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols, 2,2,4,4-tetramethyl-1,3-cyclobutanediol, hydroquinone, resorcinol, 2,2-(4,4'-dihydroxyphenyl)-sulfone, 4,4'-oxydiphenol and 4,8-bis(2-hydroxymethyl)tricyclo[$5.2.1.0^{2,6}$] decane.

Alternatively, alkoxylated polyhydric alcohols may be used to prepare the multifunctional terminally unsaturated urethane oligomer. These alkoxylated polyhydric alcohols may be selected from a variety of polyether polyols and polyester polyols. For instance, the polyether polyols may be selected from poly(propylene oxide)diols, copoly(ethylene oxide-propylene oxide)diols, poly(tetramethylene oxide)diols, poly(tetramethylene ether)diol, poly(ethylene)ether glycol, poly(1,2-propylene)ether polyol, poly(1,2- or 1,3-butylene)ether glycol, propoxylated trimethylol propane and ethoxylated glycerol. And the polyester polyols may be selected from di-, tri-, or tetrahydroxy-terminated polyesters, polyester polyols produced by the polycondensation reactions of dicarboxylic acids or their anhydrides with di-, tri-, or tetra-alcohols, poly(caprolactone), poly(1,6-hexanediol adipate), poly(1,6-hexanediol isophthalate), poly(1,4-butanediol adipate), poly(1,4-butanediol isophthalate), poly(diethylene glycol adipate), poly(diethylene glycol adipate isophthalate), poly(ethylene glycol adipate), poly(ethylene glycol propylene glycol adipate), poly(cyclohexanedimethanol adipate), poly(cyclohexanedimethanol adipate isophthalate), poly(ethylene glycol butylene glycol adipate), poly(1, 6-hexanediol neopentyl adipate) and poly(1,6-hexanediol neopentyl isophthalate).

The hydroxyl-containing compound may also be selected from hydroxyl-functional (meth)acrylates and hydroxyl-functional vinyl ethers. The hydroxyl-functional (meth)acrylates may be selected from 2-hydroxyethyl acrylate, 2-hydroxypropyl acrylate, 2-hydroxyethyl methacrylate, pentaerythritol triacrylate and 4-hydroxybutyl acrylate. And the hydroxyl-functional vinyl ethers may be selected from ethylene glycol monovinyl ether and cyclohexane dimethanol monovinyl ether.

The isocyanate-containing compound may be methylene bis(phenyl isocyanate), 2,4-toluene diisocyanate, a 80:20 mixture of 2,4- and 2,6-toluene diisocyanate, 3-isocyanatomethyl-3,5,5-trimethyl cyclohexylisocyanate, m-tetramethyl xylene diisocyanate, hexamethylene diisocyanate, methylene bis(cyclohexyl isocyanate), isophorone diisocyanate, phenyl diisocyanate, 4,4'-diphenyl diisocyanate, 4,4'-diphenylenemethane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane.

In one embodiment, the aliphatic polyether urethane oligomer comprising a multifunctional terminally unsaturated urethane oligomer is made from at least one diisocyanate with an equivalent weight between 80 and 200; at least one polyol with an equivalent weight between 100 and 2,000; at least one hydroxyacrylate or hydroxy vinyl ether; and at least one alkoxylated polyhydric alcohol with an equivalent weight between 32 and 200.

The amount of the urethane acrylate component used in the inventive compositions should be about 20 to about 70 weight percent, such as about 30 to about 50 weight percent, desirably about 35 to about 45 weight percent. When used, the hexane diol di(meth)acrylate of the reactive diluent is present in an amount of about 5 to about 15 weight percent. Likewise, when used the dimethyl acrylamide of the reactive diluent is present in an amount of about 20 to about 25 weight percent.

The photoinitiator synergist may be selected from N-methyl-diethanol amine, triethanolamine 2-(butoxy)ethyl-4-dimethyaminobenzoate and acrylated amine. The photoinitiator synergist may be used in an amount of about 5 to about 30 weight percent, such as about 10 to about 25 weight percent, desirably about 15 to about 25 weight percent.

The composition may further comprise a silane coupling agent.

The composition may further comprise a fluorescent agent.

Photoinitiators suitable for use in the present invention that will respond to visible light to initiate and induce curing with low color development, block shear strength on polycarbonate substrates of greater than 2,000 psi and tack free after exposure to visible light for 30 seconds or less include bisacyl phosphine oxide photoinitiators. For instance, U.S. Pat. No. 5,399,770 (Leppard) discloses and claims a class of compounds functional as such photoinitiators. Thus, the disclosure of the '770 patent is hereby express incorporated herein be reference in its entirety. A particularly desirable photoinitiator embraced by the '770 patent is available commercially from Ciba Specialty Chemicals under the trade name IRGACURE 819. IRGACURE 819 is bis(2,4,6-trimethyl benzoyl) phenyl phosphine oxide.

Other visible light curing photoinitiators can be used instead of the bisacyl phosphine oxide photoinitiators describe above; however, use of such other photoinitiators will likely compromise one or more of the desirable physical properties—low color development, block shear strength on polycarbonate substrates of greater than 2,000 psi and tack free after exposure to visible light for 30 seconds or less. For instance, camphorquinone peroxyester initiators; 9-fluorene carboxylic acid peroxyesters; dl-camphorquinone; IRGACURE 784DC (photoinitiator based on substituted titanocenes); two-component initiators including a dye and electron donor; three-component initiators including a dye, electron donor and oxidant; and combinations thereof. These visible light photoinitiators may be used in conjunction with the bisacyl phosphine oxide photoinitiators to achieve the desired effect.

As regards two component initiators, suitable dyes include, but are not limited to camphorquinone, 5,7-diiodo-3-butoxy-6-fluorone, rose bengal, riboflavin, eosin Y, benzil, fluorone dyes, benzil derivatives, ketocoumarins, acridine dyes, benzoflavin and combinations thereof, and suitable electron donors include, but are not limited to methyldiethanolamine, dimethyl-p-toluidine, N,N-dimethylaminoethyl methacrylate, ethyl 4-dimethylaminobenzoate and combinations thereof.

And as regards three component initiators, in addition to the two components noted above, as the third component suitable oxidants include, but are not limited to bis(trichloromethyl)triazines, onium salts and combinations thereof. Examples of onium salts include sulfonium and iodonium salts.

Other suitable visible photoinitiator systems include those disclosed in each of the following patents or publications, each of which is incorporated by reference herein in its entirety. U.S. Pat. No. 4,505,793 to Tamoto et al., which is incorporated by reference herein, discloses photopolymerization initiators that include a combination of a 3-keto-substituted cumarin compound and an active halogeno compound. A number of exemplary compounds are disclosed. Such photopolymerization initiators cure by exposure to light having wavelengths ranging between about 180 nm and 600 nm. U.S. Pat. No. 4,258,123 to Nagashima et al., which is incorporated by reference herein, discloses photosensitive resin compositions including initiator components that generate a free radical upon irradiation with actinic light. Such components include various triazine compounds, as more fully described therein.

European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3,5-triazine. Exemplary sensitizing compounds that are disclosed include dyes such as cyanine, merocyanine, coumarin, ketocoumarin, (thio)xanthene, acridine, thiazole, thiazine, oxazine, azine, aminoketone, squarylium, pyridinium, (thia)pyrylium, porphyrin, triaryl methane, (poly)methane, amino styryl compounds and aromatic polycyclic hydrocarbons. These photopolymerization initiators are sensitive to UV and visible light.

U.S. Pat. No. 5,395,862 to Neckers et al., which is expressly incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343 to Neckers et al., which is incorporated herein by reference, discloses fluorone and pyronin-Y derivatives as initiators that absorb light at wavelengths of greater than 350 nm. U.S. Pat. No. 5,545,676 to Palazzotto et al., which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts. Exemplary sensitizers and electron donors for use in the three-part system also are disclosed. Additionally, the sensitizer is capable of absorbing light in the range of about 300-1,000 nm.

Optionally, photoinitiator synergists are employed as coinitiators in conjunction with acyl ketone photoinitiators such as for example benzophenone. Suitable photoinitiator synergists include, for example, N-methyl-diethanol amine, triethanolamine 2-(butoxy)ethyl-4-dimethyaminobenzoate and reactive amine acrylates commercially available as EBECRYL P104, EBECRYL P105, and EBECRYL 7100 from UCB Radcure Chemicals Corporation, Smyrna, Ga. or CN 371, CN 373, CN 384, or CN 386 available commercially from Sartomer Company, Inc., Exton, Pa. Sartomer describes CN 373 as a reactive amine acrylate coinitiator that can be used in combination with a hydrogen abstracting photoinitiator, such as benzophenone or isopropyl thioxanthone (ITX), to promote free radical polymerization. CN 373 accelerates surface cure speed and helps overcome oxygen inhibition in UV curable coatings and inks. Sartomer describes CN 371, CN 384 and CN 386 as difunctional amine acrylate coinitiators which, when used in conjunction with a photosensitizer, such as benzophenone, promote rapid curing under UV light. Additional benefits include reduced odors, both at press side and in the cured film, and reduced blooming.

In some embodiments, the compositions may include additional resins, such as CN 983 (difunctional polyester-based resin), CN 934 (trifunctional polyether-based resin) and CN 971 (trifunctional polyether-based resin) (all commercially available from Sartomer Company, Inc.); PHOTOMER 5430 (tetra functional polyester-based resin), PHOTOMER 6010 (difunctional aliphatic urethane resin) and PHOTOMER 6623 (hexafunctional aliphatic urethane resin) (all commercially available from Cognis); and BR 374 (difunctional polyether-based resin) and BR 571 (difunctional aliphatic urethane resin) (all commercially available from Bomar Specialties Co.).

The compositions cure upon exposure to radiation in the visible range of the electromagnetic spectrum, i.e., irradiation at about 400-700 nm, desirably about 400-500 nm. The length of exposure is ordinarily less than 60 seconds, and desirably 10 seconds or less, to achieve the tack free surface, adhesion to polycarbonate substrates of greater than 1,000 psi, and substantially colorless cured product.

EXAMPLES

Example 1

In this example, several photoinitiators were evaluated in otherwise comparable sample formulations. The following samples were prepared from the constituents noted in Table 1 and mixed in a DAC 400 FVZ speed mixer.

TABLE 1

| Constituent | | Sample/ Amt. (Wt %) | | | |
|---|---|---|---|---|---|
| Type | Identity | A | B | C | D |
| Photoinitiator | IRGACURE 819 | 2 | — | — | — |
| | Camphorquinone | — | 2 | — | — |
| | IRGACURE 784 | — | — | 2 | — |
| | LUCERIN TPO | — | — | — | 2 |
| Urethane Acrylate | PHOTOMER 6019 | 22 | 22 | 22 | 22 |
| | BR 990 | 22 | 22 | 22 | 22 |
| Reactive Diluent | Hexanediol diacrylate | 10 | 10 | 10 | 10 |
| | Dimethyl acrylamide | 24 | 24 | 24 | 24 |
| Photoinitiator Synergist | EBECRYL 7100 | 20 | 20 | 20 | 20 |

Three principal techniques were used to characterize the resulting samples: surface tack, block shear adhesion and color.

Surface tack was rated on a scale of 1 to 5, with 5 being tack-free; a description of the ratings is as follows:
1. Completely uncured
2. Gelled bulk, uncured surface
3. Cured bulk; surface leaves residue on glove when contacted and typically retains all silicon carbide grit ("SiC") when dusted
4. Surface leaves no residue but feels sticky and typically retains 50-60% SiC.
5. Surface is dry, tack-free, and retains $\leq$10% SiC.

Block shear adhesion (or, shear bond strength) was measured using polycarbonate specimens (1×1×¼"); the specimens were assembled with no induced gap and with a ½ in. overlap. Thus, the bond area was about ½ in$^2$. Polycarbonate block shear specimens were assembled and cured with 470 nm at 500 mW/cm$^2$ intensity generated from a LED at a source-to-sample distance of 10 mm. The resulting block shear adhesion was measured according to ASTM D4501, "Shear Strength of Adhesive Bonds between Rigid Substrates by the Block-Shear Method," which is incorporated by reference herein, using a 20 kN load cell. Adhesive strength was measured in units of pounds per square inch of compressive pressure needed to break the bond. Results are shown in Table 2 below.

From a color standpoint, cured samples were prepared of a thickness of about 0.02 in. between glass microscope slides. Each of the cured samples were evaluated qualitatively to compare and contrast color development with respect to a UV curable acrylate-based product, known as LOCTITE 3105. LOCTITE 3105 is considered essentially colorless, and thus a "5" on the rating scale.

TABLE 2

| | Sample | | | |
|---|---|---|---|---|
| Physical Properties | A | B | C | D |
| Surface tack* | 4.0 | 3.5 | 0.5 | 1.0 |
| PC adhesion** (psi) | 4,254 | 4,429 | NA | 427 |
| Color*** | 3.5 | 0.5 | 1.0 | 4.5 |

*Surface tack: 5.0 = completely dry and tack free, 3.0 = minimally tacky but still acceptable, 1.0 = very tacky/liquid surface. Specimens cured with 465 nm LED at 500 mW/cm$^2$ intensity.
**Polycarbonate block shear specimens cured with a 470 nm LED at 500 mW/cm$^2$ intensity.
***Color rating: 5.0 = completely colorless, 3.0 = maximum color still acceptable.

These results indicate that in order to achieve a balance of each of surface tack, shear strength on polycarbonate substrates greater than 1,000 psi and substantially colorless, of the four photoinitiators chosen for evaluation, IRGACURE 819 provides such results.

Example 2

In this example, several photoinitiator synergists were evaluated in otherwise comparable sample formulations. The following samples were prepared from the constituents noted in Table 3 and mixed in a DAC 400 FVZ speed mixer.

TABLE 3

| Constituent | | Sample/Amt. (Wt %) | | | | | |
|---|---|---|---|---|---|---|---|
| Type | Identity | E | F | G | H | I | A |
| Photoinitiator | IRGACURE 819 | 2 | 2 | 2 | 2 | 2 | 2 |
| Urethane Acrylate | PHOTOMER 6019 | 22 | 22 | 22 | 22 | 22 | 22 |
| | BR 990 | 22 | 22 | 22 | 22 | 22 | 22 |
| Reactive Diluent | Hexanediol diacrylate | 10 | 10 | 10 | 10 | 30 | 10 |
| | Dimethyl acrylamide | 24 | 24 | 24 | — | 24 | 24 |
| Photoinitiator Synergist | CN 373 | 20 | — | — | — | — | — |
| | CN 384 | — | 20 | — | — | — | — |
| | CN 386 | — | — | 20 | — | — | — |
| | EBECRYL 7100 | — | — | — | 44 | — | 20 |

As in Example 1, surface tack, block shear strength to polycarbonate substrates and color were evaluated, with the results shown below in Table 4.

TABLE 4

| Physical | Sample | | | | | |
|---|---|---|---|---|---|---|
| Properties | E | F | G | H | I | A |
| Surface tack* | 4 | 3 | 3 | 4.5 | 1 | 4 |
| PC adhesion** (psi) | 939 | 1461 | 889 | 882 | 4327 | 4254 |
| Color*** | 3.5 | 3.5 | 3.5 | 3.5 | 3.5 | 3.5 |

*Surface tack: 5.0 = completely dry and tack free, 3.0 = minimally tacky but still acceptable, 1.0 = very tacky/liquid surface. Specimens cured with 465 nm LED at 500 mW/cm$^2$ intensity.
**Polycarbonate block shear specimens cured with a 470 nm LED at 500 mW/cm$^2$ intensity.
***Color rating: 5.0 = completely colorless, 3.0 = maximum color still acceptable.

These results indicate that in order to achieve a balance of each of surface tack, shear bond strength on polycarbonate substrates greater than 1,000 psi and substantially colorless, of the four photoinitiator synergists chosen for evaluation, EBECRYL 7100 and CN 384 provide such results, and EBECRYL 7100 provides a shear bond strength on polycarbonate substrates greater than 4,000 psi.

Example 3

In this example, several reactive diluents were evaluated in otherwise comparable sample formulations. The following samples were prepared from the constituents noted in Table 5 and mixed in a DAC 400 FVZ speed mixer.

TABLE 5

| Constituent | | Sample | | | | |
|---|---|---|---|---|---|---|
| Type | Identity | J | K | L | M | A |
| Photoinitiator | IRGACURE 819 | 2 | 2 | 2 | 2 | 2 |
| Urethane Acrylate | PHOTOMER 6019 | 22 | 22 | 22 | 22 | 22 |
| | BR 990 | 22 | 22 | 22 | 22 | 22 |
| Reactive Diluent | Hexanediol diacrylate | — | — | — | — | 10 |
| | Dimethyl acrylamide | 24 | 24 | 24 | 24 | 24 |

TABLE 5-continued

| Constituent | | Sample | | | | |
|---|---|---|---|---|---|---|
| Type | Identity | J | K | L | M | A |
| | IBOA | 10 | — | — | — | — |
| | Ethoxyethoxyethyl acrylate | — | 10 | — | — | — |
| | Tetrahydrofurfuryl acrylate | — | — | 10 | — | — |
| | Ethoxylated THF-A | — | — | — | 10 | — |
| Photoinitiator Synergist | EBECRYL 7100 | 20 | 20 | 20 | 20 | 20 |

As in Example 1, surface tack, block shear strength to polycarbonate substrates and color were evaluated, with the results shown below in Table 6.

TABLE 6

| Physical | Sample | | | | |
|---|---|---|---|---|---|
| Properties | J | K | L | M | A |
| Surface tack* | 2 | 3 | 3 | 2.5 | 4 |
| Surface tack*[1] | 4 | 5 | 5 | 4 | 5 |
| PC adhesion** (psi) | 2,946 | 3,979 | 3,581 | 4,464 | 4,254 |
| Color*** | 3.5 | 3.5 | 3.5 | 3.5 | 3.5 |

*Surface tack: 5.0 = completely dry and tack free, 3.0 = minimally acceptable tack, 1.0 = very tacky/liquid surface. Specimens cured for 10 seconds with 465 nm LED at 500 mW/cm$^2$ intensity.
*[1]Surface tack: Specimens cured for 10 seconds with LOCTITE 7420 (UV-shielded metal halide light) @ 65 mW/cm$^2$
**Polycarbonate block shear specimens cured with a 470 nm LED at 500 mW/cm$^2$ intensity.
***Color rating: 5.0 = completely colorless, 3.0 = maximum color still acceptable.

These results indicate that in order to achieve a balance of each of surface tack, shear strength on polycarbonate substrates greater than 1,000 psi and substantially colorless (i.e., a color rating of 3 or greater), of the six reactive diluents chosen for evaluation, dimethyl acrylamide, ethoxyethoxyethyl acrylate and tetrahydrafurfuryl acrylate provide such results, with each providing a shear bond strength on polycarbonate substrates greater than 3,500 psi.

Example 4

Here, two samples were prepared from the constituents noted in Table 7 and mixed in a DAC 400 FVZ speed mixer. Sample M was formulated and determined to have a viscosity of 200 cPs and Sample N a viscosity of 4,000 cPs.

TABLE 7

| Constituents | | Sample/Amt (Wt %) | |
|---|---|---|---|
| Type | Identity | M | N |
| Photoinitiator | IRGACURE 819 | 2 | 3.5 |
| Urethane Acrylate | PHOTOMER 6019 | 22 | 19.12 |
| | BR 990 | 22 | — |
| | BR 582E | — | 47.14 |
| Reactive Diluent | Hexanediol diacrylate | 10 | 6.740 |
| | Dimethyl acrylamide | 23.995 | 22 |
| Photoinitiator Synergist | EBECRYL 7100 | 20 | — |
| Coupling Agent | SILQUEST A-187 | — | 1.5 |
| Fluorescing Agent | UVITEX OB* | 0.005 | 0.005 |

*2,5-bis(5'-t-butyl-2-benzoxazol-2-yl)thiophene

Here, lap shear and block shear bond strength were evaluated for Samples M and N on the substrates noted. In each instance, visible light was irradiated at the assemblies so that the polycarbonate substrate (in the case where only one was used) was the first surface of the assembly receiving the dosage.

TABLE 6

| Physical Properties (Substrates) | Sample | |
| --- | --- | --- |
| | M | N |
| Block shear strength (psi) | | |
| PC—PC | 3,941 | 3,205 |
| PC-PEBAX 6333* | 1,351 | 1,447 |
| Lap shear strength (psi) | | |
| PC-Stainless Steel | 500 | 645 |
| Surface Tack | 4 | 4 |

*PEBAX 6333 is a brand name of Zeus for a nylon having elastic memory, low temperature properties, elongation and Shore D hardness ranging from 35 to 72.

What is claimed is:

1. A visible light curable composition comprising:
    A urethane component, comprising one or more of
    A station wherein the radiation curable composition is dispensed onto at least one substrate, and
    A station wherein the at least substrate to which has been applied the radiation curable composition is exposed solely to radiation in the visible range of the electromagnetic spectrum generated from the solely visible radiation-generating source,
    wherein health risks selected from the group consisting of erythema, photokeratitis, and combinations thereof of an individual using the system and being exposed to an environment in which radiation curable compositions are being cured by exposure to radiation in the electromagnetic spectrum are reduced,
    wherein the radiation curable composition comprises
        A urethane component, comprising one or more of
            An aliphatic urethane triacrylate comprising the combination of greater than 50% of a urethane acrylate and less than 50% of tripropylene glycol diacrylate,
            An aliphatic polyether urethane oligomer comprising a multifunctional terminally unsaturated urethane prepared from one or more hydroxyl-functional vinyl ethers selected from the group consisting of ethylene glycol monovinyl
            An aliphatic urethane triacrylate comprising the combination of greater than 50% of a urethane acrylate and less than 50% of tripropylene glycol diacrylate,
            An aliphatic polyether urethane oligomer comprising a multifunctional terminally unsaturated urethane oligomer comprising the reaction product of (a) a terminally unsaturated isocyanate containing polyurethane oligomer with (b) an alkoxylated polyhydric alcohol,
            A trifunctional aliphatic urethane acrylate oligomer,
        A reactive diluent comprising the combination of two or more of hexane diol di(meth)acrylate present in an amount of about 5 to about 15 weight percent, dimethyl acrylamide present in an amount of about 20 to about 25 weight percent, ethoxyethoxyethyl acrylate and tetrahydrafurfuryl acrylate,
        A photoinitiator triggered upon exposure to radiation in the visible range of the electromagnetic spectrum, and
        A photoinitiator synergist, wherein the multifunctional terminally unsaturated urethane oligomer is prepared from one or more hydroxyl-functional vinyl ethers selected from the group consisting of ethylene glycol monovinyl ether and cyclohexane dimethanol monovinyl ether.

2. The composition of claim 1, wherein the cured radiation curable composition demonstrates a shear bond strength of greater than 1,000 psi when adhering together two substrates in a bond area of about ½ in$^2$, wherein at least one substrate is constructed from polycarbonate.

3. The composition of claim 1, wherein the aliphatic urethane triacrylate, aliphatic polyether urethane oligomer or trifunctional aliphatic urethane acrylate oligomer is made from a polyol selected from the group consisting of 2,2-(4,4'-dihydroxydiphenyl)-propane, 4,4'-iso-propylidenedicyclohexanol, ethoxylated bisphenol-A, propoxylated bisphenol-A, 2,2-(4,4'-dihydroxydiphenyl)-butane, 3,3-(4,4'-dihydroxydiphenyl)-pentane, α,α'-(4,4'-dihydroxydiphenyl)-p-diisopropylbenzene, 1,3-cyclohexane diol, 1,4-cyclohexane diol, 1,4-cyclohexanedimethanol, bicyclic and tricyclic diols, 2,2,4,4-tetramethyl-1,3-cyclobutanediol, hydroquinone, resorcinol, 2,2-(4,4'-dihydroxyphenyl)-sulfone, 4,4'-oxydiphenol and 4,8-bis(2-hydroxymethyl)tricyclo [5.2.1.0$^{2,6}$] decane.

4. The composition of claim 1, wherein the photosynergist is a member selected from the group consisting of N-methyl-diethanol amine, triethanolamine 2-(butoxy)ethyl-4-dimethyaminobenzoate and acrylated amines.

5. The composition of claim 1, further comprising a silane coupling agent.

6. The composition of claim 1, further comprising a fluorescent agent.

7. A method for reducing the health risks of an individual exposed to an environment in which radiation curable compositions are being cured by exposure to radiation in the electromagnetic spectrum, said method comprising the steps of:
    Providing a radiation curable composition, in accordance with claim 1, capable of being cured by exposure to radiation solely in the visible range of the electromagnetic spectrum,
    Providing two or more substrates, at least one of which is substantially transmissive to radiation in the visible range of the electromagnetic spectrum,
    Applying said radiation curable composition to said at least one substrate, and
    Exposing said radiation curable composition applied to at least one substrate to a source which generate soley said radiation in the visible range of the electromagnetic spectrum for a period of time of 60 seconds or less so as to cure said radiation curable composition,
    wherein the health risks are selected from the group consisting of erythema, photokeratitis, and combinations thereof.

8. A method of bonding two or more substrates, at least one of which is substantially transmissive to radiation in the visible range of the electromagnetic spectrum, said method comprising the steps of:
    Providing a radiation curable composition in accordance with claim 1, capable of being cured by exposure to radiation solely in the visible range of the electromagnetic spectrum,
    Providing two or more substrates, at least one of which is substantially transmissive to radiation in the visible range of the electromagnetic spectrum,
    Applying said radiation curable composition to said at least one substrate, and
    Exposing said radiation curable composition applied to at least one substrate to a source to generate solely said radiation in the visible range of the electromagnetic spectrum for a period of time of 60 seconds or less so as to cure said radiation curable composition.

9. The method of claim 8, wherein the cured radiation curable composition demonstrates a shear bond strength of greater than 1,000 psi when adhering together two substrates in a bond area of about ½ in$^2$, wherein at least one substrate is constructed from polycarbonate.

10. The method of claim 8, wherein the cured radiation curable composition demonstrates substantially no coloring.

11. A system for bonding together two or more substrates, at least one of which being constructed from a material that is substantially transmissive to radiation in the visible range of the electromagnetic spectrum, using a radiation curable composition in accordance with cliam 1 which is capable of curing upon exposure to radiation in the visible range of the electromagnetic spectrum, said system comprising:
   A source for generating radiation solely in the visible range of the electromagnetic spectrum,
   A source for dispensing radiation curable composition,
   A station wherein radiation curable composition is dispensed onto at least one substrate, and
   A station wherein the at least substrate to which has been applied radiation curable composition is exposed solely to radiation in the visible range of the electromagnetic spectrum generated from the solely visible radiation-generating source,
   wherein health risks selected from the group consisting of erythema, photokeratitis, and combinations thereof of an individual using the system and being exposed to an enivronment in which radiation curable compositions are being cured by exposure to radiation in the electromatic spectrum are reduced.

12. A system for bonding together two or more substrates, at least one of which being constructed from a material that is substantially transmissive to radiation in the visible range of the electromagnetic spectrum, using a radiation curable composition which is capable of curing upon exposure to radiation in the visible range of the electromagnetic spectrum, said system comprising:
   A source for generating radiation solely in the visible range of the electromagnetic spectrum,
   A source for dispensing the radiation curable composition,
   A station wherein the radiation curable composition is dispensed onto at least one substrate, and
   A station wherein the at least substrate to which has been applied the radiation curable composition is exposed solely to radiation in the visible range of the electromagnetic spectrum generated from the solely visible radiation-generating source,
   wherein health risks selected from the group consisting of erythema, photokeratitis, and combinations thereof of an individual using the system and being exposed to an environment in which radiation curable compositions are being cured by exposure to radiation in the electromagnetic spectrum are reduced,
   wherein the radiation curable composition comprises
      A urethane component, comprising one or more of
         An aliphatic urethane triacrylate comprising the combination of greater than 50% of a urethane acrylate and less than 50% of tripropylene glycol diacrylate,
         An aliphatic polyether urethane oligomer comprising a multifunctional terminally unsaturated urethane oligomer prepared from one or more hydroxyl-functional vinyl ethers selected from the group consisting of ethylene glycol monovinyl ether and cyclohexane dimethanol monovinyl ether, and
         A trifunctional aliphatic urethane acrylate oligomer,
      A reactive diluent comprising the combination of two or more of hexane diol di(meth)acrylate, dimethyl acrylamide, ethoxyethoxyethyl acrylate and tetrahydrafurfuryl acrylate,
      A photoinitiator triggered upon exposure to radiation in the visible range of the electromagnetic spectrum, and
      A photoinitiator synergist, wherein the radiation generating source is a mercury or metal halide based lamp, equipped to eliminate radiation below 400 nm.

13. A system for bonding together two or more substrates, at least one of which being constructed from a material that is substantially transmissive to radiation in the visible range of the electromagnetic spectrum, using a radiation curable composition which is capable of curing upon exposure to radiation in the visible range of the electromagnetic spectrum, said system comprising:
   A source for generating radiation solely in the visible range of the electromagnetic spectrum,
   A source for dispensing the radiation curable composition,
   A station wherein the radiation curable composition is dispensed onto at least one substrate, and
   A station wherein the at least substrate to which has been applied the radiation curable composition is exposed solely to radiation in the visible range of the electromagnetic spectrum generated from the solely visible radiation-generating source,
   wherein health risks selected from the group consisting of erythema, photokeratitis, and combinations thereof of an individual using the system and being exposed to an environment in which radiation curable compositions are being cured by exposure to radiation in the electromagnetic spectrum are reduced,
   wherein the radiation curable composition comprises
      A urethane component, comprising one or more of
         An aliphatic urethane triacrylate comprising the combination of greater than 50% of a urethane acrylate and less than 50% of tripropylene glycol diacrylate,
         An aliphatic polyether urethane oligomer comprising a multifunctional terminally unsaturated urethane prepared from one or more hydroxyl-functional vinyl ethers selected from the group consisting of ethylene glycol monovinyl ether and cyclohexane dimethanol monovinyl ether, and
         A trifunctional aliphatic urethane acrylate oligomer,
      A reactive diluent comprising the combination of two or more of hexane diol di(meth)acrylate, dimethyl acrylamide, ethoxyethoxyethyl acrylate and tetrahydrafurfuryl acrylate,
      A photoinitiator triggered upon exposure to radiation in the visible range of the electromagnetic spectrum, and
      A photoinitiator synergist, wherein the radiation generating source is a LED that emits radiation above 400 nm.

14. A system for bonding together two or more substrates, at least one of which being constructed from a material that is substantially transmissive to radiation in the visible range of the electromagnetic spectrum, using a radiation curable composition which is capable of curing upon exposure to radiation in the visible range of the electromagnetic spectrum, said system comprising:
   A source for generating radiation solely in the visible range of the electromagnetic spectrum,
   A source for dispensing the radiation curable composition, ether and cyclohexane dimethanol monovinyl ether, and
   A trifunctional aliphatic urethane acrylate oligomer, A reactive diluent comprising the combination of two or more of hexane diol di(meth)acrylate, dimethyl acrylamide, ethoxyethoxyethyl acrylate and tetrahydrafurfuryl acrylate, A photoinitiator triggered upon exposure to radiation in the visible range of the electromagnetic spectrum, and A photoinitiator synergist, wherein the radiation generating source is an OLED that emits radiation above 400 nm.

* * * * *